United States Patent
Kling et al.

(10) Patent No.: US 9,065,809 B2
(45) Date of Patent: Jun. 23, 2015

(54) METHOD AND NODE FOR DISTRIBUTING ELECTRONIC CONTENT IN A CONTENT DISTRIBUTION NETWORK

(75) Inventors: Lars-Örjan Kling, Södertälje (SE);
Kjell Nyström, Trångsund (SE);
Thomas Johansson, Haninge (SE);
Stefan Hellkvist, Stockholm (SE);
Hareesh Puthalath, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 789 days.

(21) Appl. No.: 13/375,022

(22) PCT Filed: Jun. 3, 2009

(86) PCT No.: PCT/SE2009/050658
§ 371 (c)(1),
(2), (4) Date: Nov. 29, 2011

(87) PCT Pub. No.: WO2010/140938
PCT Pub. Date: Dec. 9, 2010

(65) Prior Publication Data
US 2012/0072526 A1    Mar. 22, 2012

(51) Int. Cl.
*G06F 15/167* (2006.01)
*H04L 29/08* (2006.01)

(52) U.S. Cl.
CPC ............ *H04L 67/06* (2013.01); *H04L 67/2842* (2013.01); *H04L 67/2852* (2013.01)

(58) Field of Classification Search
CPC .. H04L 67/06; H04L 67/2842; H04L 67/2852
USPC ....................................................... 709/213
See application file for complete search history.

(56) References Cited

U.S. PATENT DOCUMENTS

| | | | |
|---|---|---|---|
| 6,167,438 | A | 12/2000 | Yates |
| 6,317,778 | B1 | 11/2001 | Dias |
| 6,502,175 | B1 | 12/2002 | Krishnan |

(Continued)

FOREIGN PATENT DOCUMENTS

| | | |
|---|---|---|
| FR | 2788352 A1 | 7/2000 |
| JP | 20003280975 A | 10/2003 |

OTHER PUBLICATIONS

Fielding, et al., Network Working Group, Request for Comments: 2616, Hypertext Transfer Protocol—HTTP/1.1, Jun. 1999.

(Continued)

*Primary Examiner* — Jerry Dennison

(57) ABSTRACT

The present invention relates to a method and node for efficiently distributing electronic content in a content distribution network (CDN) comprising a plurality of cache nodes. Embodiments of the present invention include a virtual node logically representing a set of cache nodes. The set of cache nodes is in turn defined based on an internal communication cost between the cache nodes. In each of the cache nodes represented by the virtual node statistics regarding content requests is collected, and based on this statistics it is determined whether specific content is to be cached in the virtual node or not. If it is determined to cache specific content in the virtual node, the specific content may be caused to be cached in one or more of the cache nodes represented by the virtual node.

16 Claims, 7 Drawing Sheets

(56) References Cited

U.S. PATENT DOCUMENTS

| | | | |
|---|---|---|---|
| 7,219,160 B1* | 5/2007 | Buchsbaum et al. | 709/242 |
| 7,627,691 B1* | 12/2009 | Buchsbaum et al. | 709/242 |
| 2002/0048269 A1 | 4/2002 | Hong | |
| 2002/0184403 A1* | 12/2002 | Dahlin et al. | 709/316 |
| 2003/0028819 A1 | 2/2003 | Chiu | |
| 2003/0115346 A1* | 6/2003 | McHenry et al. | 709/229 |
| 2003/0195940 A1* | 10/2003 | Basu et al. | 709/213 |
| 2003/0217113 A1 | 11/2003 | Katz | |
| 2004/0167981 A1* | 8/2004 | Douglas et al. | 709/225 |
| 2005/0193131 A1 | 9/2005 | Bai | |
| 2012/0072526 A1* | 3/2012 | Kling et al. | 709/213 |
| 2013/0086326 A1* | 4/2013 | Revanuru | 711/122 |
| 2013/0268933 A1* | 10/2013 | Bhandari et al. | 718/1 |
| 2013/0325942 A1* | 12/2013 | Chen et al. | 709/204 |
| 2014/0237071 A1* | 8/2014 | Friman et al. | 709/216 |

OTHER PUBLICATIONS

Karger, et al., Consistent Hashing and Random Trees: Distributed Caching Protocols for Relieving Hot Spots on the World Wide Web, STOC '97 Proceedings of the Twenty-Ninth Annual ACM Symposium on Theory of Computing, pp. 654-663, May 1997.

Ting, Yi-Wei, et al., "A Novel Cooperative Caching Scheme for Wireless Ad Hoc Networks: GroupCaching," International Conference on Networking, Architecture, and Storage, 2007, pp. 62-68, Sections 1-3, abstract.

Gupta, Himanshu, et al., "Data Caching under Number Constraint," IEEE International Conference on Communications, 2006, pp. 435-440, abstract.

\* cited by examiner

Virtual node 430

Cache node 407

| Content in node | Number of requests | Cost for retrieving content |
| --- | --- | --- |
| Content not in node | Number of requests | Cost for retrieving content |

Cache node 408

| Content in node | Number of requests | Cost for retrieving content |
| --- | --- | --- |
| Content not in node | Number of requests | Cost for retrieving content |

Cache node 409

| Content in node | Number of requests | Cost for retrieving content |
| --- | --- | --- |
| Content not in node | Number of requests | Cost for retrieving content |

Figure 6

METHOD AND NODE FOR DISTRIBUTING ELECTRONIC CONTENT IN A CONTENT DISTRIBUTION NETWORK

TECHNICAL FIELD

The present invention relates generally to communications networks, and in particular, to a method and node for efficiently distributing electronic content in a content distribution network.

BACKGROUND

Content delivery networks (CDNs) provide a caching infrastructure in IP networks to support multimedia services. Existing methods and systems used in CDNs do not take into account the different possible factors that affect optimal content placement in cache nodes. As a result, content distribution makes inefficient use of network resources.

In current solutions, when content is requested from various parts of the network, content is migrated to the cache nodes where it is most needed. Traditionally this is done in a greedy fashion where the cache nodes store every piece of content that pass through them assuming that the content has a high demand, present and future. In other solutions the content provider gives an initial indication of the predicted demand for the content. In all of these solutions the client is always redirected to its closest cache node, regardless of whether the cache node has the content or not. The cache node, upon receiving the client request for content, will check if it has the requested content and, if so, respond to the client. If the content is not available in the cache node, this will result in a cache miss and the request will be redirected to the most appropriate cache node caching the requested content. This redirection is performed by an allocator node (also called locator node), which is the node responsible for redirecting clients to the appropriate cache nodes in the CDN, and thereafter the content will be cached in the cache node closest to the client and thus in the cache node that received the initial request for the content. If the first allocator node that received the request does not know where the content is cached, the first allocator node may send a redirection to a second allocator and so on until an allocator that knows where the content is stored can be found and the final redirection decision can be sent to a cache node. Cache nodes have a maximum storage capacity and when cache nodes are filled up some decision must be made on what content to keep and what content to replace. Depending on the requirements there are numerous algorithms for selecting what to keep such as Least Recently Used (LRU), Most Recently Used (MRU) and Least Frequently Used (LFU). Thus, content with a low frequency of requests with respect to other content will be deleted from the cache node to make room for new content for which it in practice may not be a high demand for.

Further, in a CDN the caching nodes are usually positioned at the edge of an aggregation network. This is an ideal place as it is sufficiently close to the end users and at the same time has good symmetrical bandwidth among caching nodes within the aggregation network. A cache miss may however cause a content request to be forwarded to a cache node located outside of the aggregation network which may result in that the fetching of the content will have to be processed through the costlier core network. This is unfortunate and may result in large impact of the network and an inefficient use of the same, and should thus be avoided as much as possible.

SUMMARY

An object of the present invention is therefore to provide a method and node that more efficiently uses the resources of a content delivery network.

According to an embodiment of the present invention a method for caching content in a content delivery network (CDN) is provided. The method defines a virtual node logically representing a set of cache nodes. The set of cache nodes is in turn defined based on an internal communication cost between the cache nodes. In each of the cache nodes represented by the virtual node statistics regarding content requests is collected, and based on this statistics it is determined whether specific content is to be cached in the virtual node or not. If it is determined to cache specific content in the virtual node, the specific content may be caused to be cached in one or more of the cache nodes represented by the virtual node.

An advantage with this method is that content in the network may be more optimally distributed since the caching decision is based on the actual demand from a set of cache nodes.

In another embodiment, the present invention is directed to a cache decision entity for storing content in a content delivery network. The network has a plurality of content cache nodes to which content is distributed. The entity comprises means for defining a set of cache nodes based on an internal communication cost between the cache nodes and means for defining a virtual node logically representing said set of cache nodes. The entity further comprises a counter for collecting statistics regarding content requests in each of the cache nodes that is represented by the virtual node. A processor is included for determining whether specific content is to be cached in the virtual node or not. This determination is based on statistics gathered from all the cache nodes represented by the virtual node. The entity also includes a transmitter for causing specific content, by sending a proposal to affected cache nodes, to be cached in one or more of the cache nodes represented by the virtual node.

An advantage with such an entity compared to known entities for caching content is that content in the network may be more optimally distributed since the entity is configured to base a caching decision on the actual demand from a set of cache nodes.

BRIEF DESCRIPTION OF THE DRAWINGS

Reference will now be made, by way of example, to the accompanying drawings, in which:

FIG. 6 illustrates an example of an entry in a virtual node; and

DETAILED DESCRIPTION

Figure 1:
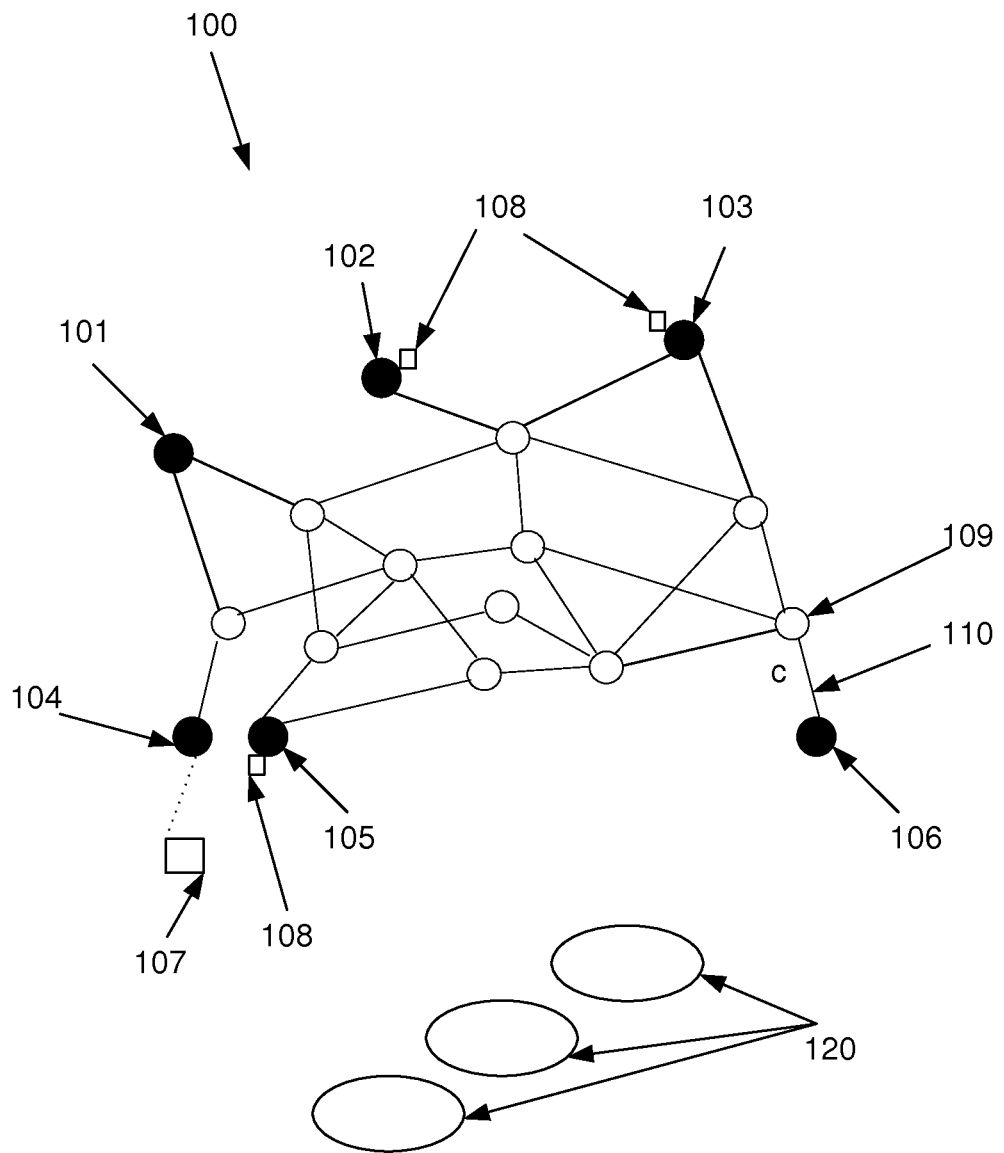
FIG. 1 illustrates a simplified version of content delivery network.

The present invention is a method and node of controlling content distribution networks to provide content in optimal locations in the network. FIG. 1 schematically illustrates an example of a CDN 100. The network comprises a number of edge nodes, also called cache nodes 101-106 represented by filled circles wherein content, e.g. data files are cached only on edge nodes. In this example an end user computer 107, also called client, is connected to only one edge node 104. In this example one specific data file 108 is stored in two edge nodes 102, 103. The non-filled circles represent intermediate nodes 109 in the network that connects the edge nodes to each other. The lines between the circles represent links 110 between the nodes. The intermediate nodes 109 are e.g. routers and switches. Each link represents a communication cost, indicated by the letter "c". The cost for different links can vary significantly depending on e.g. the connection and the distance between the nodes. For the sake of clarity the reference numerals c, 109 and 110 are only shown once in the figure. The cost is a measure of the communication cost, and may include e.g. capacity, bandwidth constrains, jitter, delay, and average packet loss rate.

In accordance with the present invention decisions regarding when a particular content is to be cached in a cache node or not is made on statistics gathered over a period of time. The job of gathering this statistics is preferably performed by allocator nodes 120 that can survey all requests made in the network and keep special gain counters for particular content for each cache node. An allocator node 120 is a node that determines in which cache nodes to place and migrate content by using different statistics. The allocator node may also take on the role of a locator node and may then, upon request for a particular piece of content, redirect to the appropriate cache node that has that piece of content and return the address of that cache node as a redirect reply. Allocator node and the locator node are two roles of a cache decision/finding entity and are complimentary. They can be included in the same entity and they can be included in separate entities as well. Even if content is not yet placed in a cache node there may still be a gain counter for that content in the cache node to make it possible, after a certain time period, to compare the gain of storing a particular content in the cache node with the gain of storing other content in the same cache node. The fact that statistics is gathered first before the caching decision is made makes it possible to make more advanced calculations on the value of caching a particular content. This results in less risk of pushing out content that are valuable and it is possible to avoid unnecessary transfer of data and writing in the cache.

In this method of deferred caching, the statistics regarding content requests are preferably kept by an allocator node. For each request for a certain piece of content, the gain of storing that content is incremented in all relevant counters for all relevant cache nodes. The actual amount to increment each counter by is determined by a certain gain function which can be constructed in many ways depending on what the system would like to optimize. The gain function could for instance take topology information into account to enhance network utilization or bandwidth/latency measurements to decrease latency for the clients. When a caching decision is made the gain of storing a particular file may be compared to the gain of storing other files in the particular cache. The most optimal files, according to the statistics gathered, are stored. The simplest form of gain function would be to merely state that the gain for caching a particular piece of content is equal to the number of requests for the particular piece of content, i.e. only base the gain function on content demand. A preferred alternative is to state the gain is equal to the number of requests times the cost for retrieving the content. Thus, content that is fetched from a far away location will gain priority over content cached in cache nodes located nearby.

In the present invention, there are thus two main factors that are used to determine if content is to be cached or not: cost factor and the content demand factor, i.e. number of requests. Note however that further factors can be used, e.g. a business factor and/or an abstract factor.

The cost factor is dependent on the physical topology of the network and also on the conditions of the links which connect the various cache nodes. In an access network, information on available bandwidth in links is used to determine the cost. The cost factor may be dynamically configured to react to the dynamic network environment. In the internet model, the transit cost SLA is preferably used. In an Internet scenario, two basic approaches may be taken to gather more information about the physical network: active and passive probing. Active probing occurs when the cache nodes send packets to each other and monitor certain parameters such as bandwidth, jitter, delay, number of hops and average packet lost. Passive probing takes advantage of the packets that are being sent between the cache nodes and extracts information from packets.

Content demand factor is based on observed and expected information. Observed information is derived from a measure of popularity of content based on a real-time measurement of the demand of the content. As more user requests are made for a particular content, the more likely is it that the content will be cached by a set of cache nodes. Expected information is used to predict which cache nodes to populate with which content before the content has actually been requested by the user. Expected information may be sourced from the knowledge that a particular content will be in high demand, for example the release of a Hollywood blockbuster. The history of user viewing habits may also be used to create this information. Content that is expected to be requested may be pre-cached at strategic cache nodes close to the potential users that may request the content.

The business factor is a caching decision which is based on payments from a content or service provider. The content/service providers' interest is to provide cached content to be located closer to the viewer. This more localized caching decreases delay and jitter, thereby improving the viewer experience. In particular, HD-content distribution (streaming or downloading) is affected by the content location. For streaming content, the issue is degraded viewing experience based on packet loss. For downloading, it is the time between content request and the state of the system ready for playout which is affected.

The abstract factor determines the cache level of the content if a hierarchical caching method is used. As the name implies, this is an abstract concept. It is used to make a decision if content should be moved closer to the user or moved away from the user towards the head-end with the long-tail (or backend) server.

All or some of these factors can be taken into account and expressed in the appropriate way to determine the gain function and thus control a cache decision entity such as an allocator node. According to the above, content may be cached only if there is a definite value in caching it. In other words, content with a low frequency of requests with respect to other requested content in the area of coverage of the cache node will not be cached. Referring again to FIG. 1, in case the content 108 is requested by cache node 104, the allocator node 120 may determine whether the content 108 is suitable to be cached in cache node 104 or merely fetched from one of the cache nodes 102, 103 or 105 containing the content. The allocator node 120 may base this decision on content demand and cost, but e.g. also on the abstract and business factor.

Figure 2:
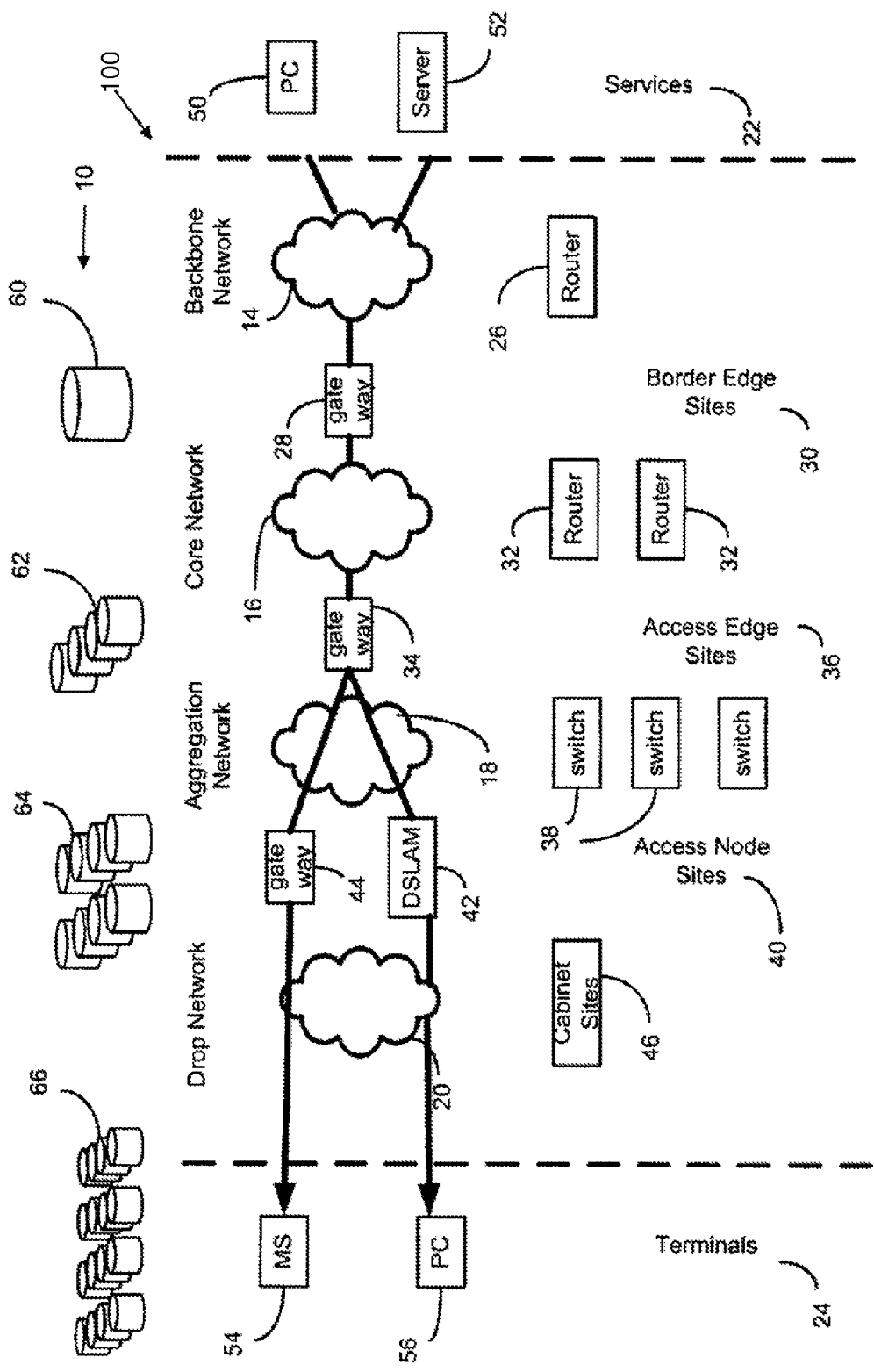
FIG. 2 also illustrates a simplified block diagram of a content delivery network.

FIG. 2 is a simplified block diagram of a content delivery network 100. The CDN 100 depicted in FIG. 2 includes a backbone network 14, a core network 16, an aggregation network 18, a drop network 20 providing communications between services 22 and terminals 24. The backbone network 14 includes a plurality of backbone routers 26. Between the backbone network and the core network 16 is a border gateway 28 which includes border edge sites 30. The core network 16 includes a plurality of core routers 32. Between the core network 16 and the aggregation network 18 is an access edge gateway 34 and access edge sites 36. The aggregation network 18 includes a plurality of aggregation switches 38. Between the aggregation network and the drop network is access node sites 40, such as a Digital Subscriber Line Access Multiplexer (DSLAM) 42 and a gateway 44. The drop network 20 may include cabinet sites 46. The services may include a wide variety of nodes, such as a personal computer 50, a server 52, etc. The terminals 24 may include mobile stations 54, personal computer 56, etc.

The network 100 illustrated in FIG. 2 utilizes a plurality of hierarchical caches to store content. The top portion illustrates a plurality of cache nodes at different levels of the CDN 100. As depicted in FIG. 2, the plurality of cache nodes includes a first (root) level 60 of caches located nearest the services. Next, between the core network 16 and the aggregation network 18 is a second level 62 of cache nodes. Between the aggregation network and the drop network 16 is a third level 64 of cache nodes. At the terminal level is located a fourth level 66 of cache nodes. Although FIG. 2 depicts a fully distributed system, the present invention may also be applied to model network-only equipment. In addition, although several different types of networks and nodes are shown, it should be understood that the present invention may be implemented with any number and type of nodes and networks.

In most typical broadband networks, the network is usually categorised into the access network, aggregation or metro network and finally the core network. From a purely traffic perspective, the access network is usually the most congested and has usually an asymmetric link to the aggregation network. Nodes in the aggregation network usually have significant spare bandwidth in the links among them than probably with a node in the core network which is more congested. Further, any traffic generated from the access/aggregation network towards the core is usually costlier than traffic terminated within the aggregation network. This is because the cost of the links towards the core is usually more costly than the aggregation links.

A caching system overlaying such a network will usually place its caching nodes at the edge of the aggregation network. This is an ideal place as it is sufficiently close to the end users and at the same time has good symmetrical bandwidth among caching nodes as well. The caching system will try to terminate content requests at the boundary of the aggregation network and prevent it being forwarded upstream. However, a cache miss in such a system will cause a request to be forwarded upstream to a higher level cache node or origin server (i.e. move more towards the core of the network). This will introduce additional traffic in the links going upstream.

The CDN architecture according to the present invention has the ability to collect information from the entire network. Specifically the allocator node, i.e. the node responsible for redirecting clients to the appropriate caches, is collecting statistics about the requests it is receiving about particular content. It uses this information to decide which the best content to be cached at a given cache node is, or vice versa, the best cache node to cache a particular content. This may be done periodically given the whole set of content that are served by the cache node. One artifact of this design is that an allocator node has a global picture of all the requests for a particular content. This enables it to capture regional/global demand for a particular piece of content. The present invention provides a method to the allocator node to use this information in its caching decisions and thus possibly reduce core traffic and thus save communication costs. The present invention provides a method to the allocator node to propose cache nodes to cache content even though there is no relative local demand for it. This is because this object is popular at a regional level and there is a value for caching it in a region.

Figure 3:
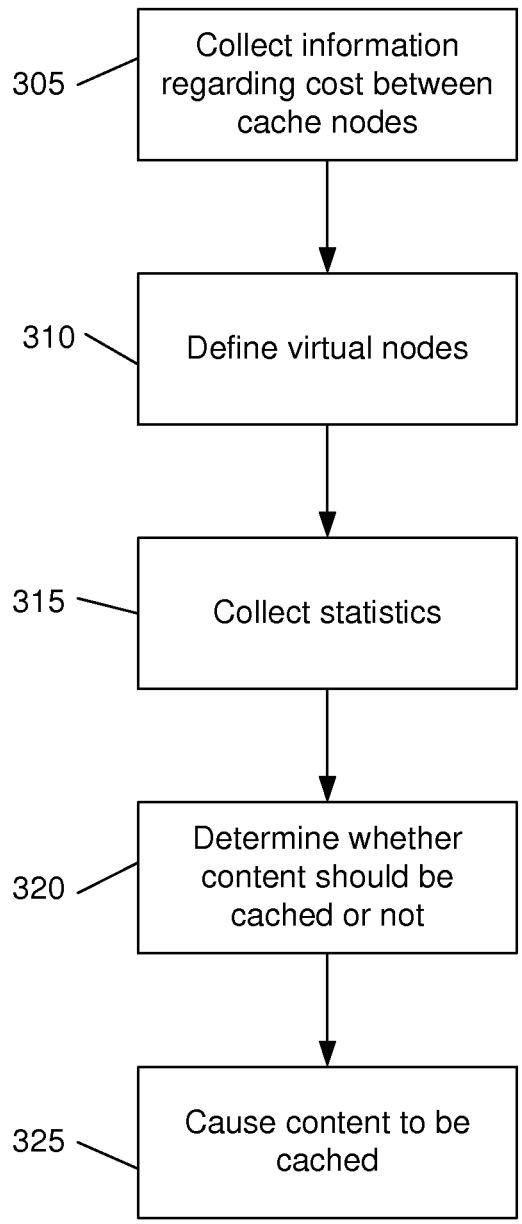
FIG. 3 is a flowchart illustrating the steps of defining virtual nodes and using statistics in accordance with the present invention.

To identify content demand in a region, there should be ways for defining regions. A method for defining and using the statistics collected by the allocator node distributing content in the CDN will be described below with reference to FIG. 3. The scheme starts with step 305 in which information regarding cost between cache nodes in the network is collected. One way of doing this is by using a distance table, also called cost table, which is a table comprising a matrix of entries each holding the distance/cost between all pairs of cache nodes. In step 310 the information collected in step 305 is used to define virtual nodes. A virtual node can be seen as a logical representation of one or more cache nodes. Preferably the cache nodes represented by the virtual node are chosen based on the communication cost between these cache nodes. E.g. all cache nodes that are within a certain communication cost, i.e. having an internal communication cost being below a certain threshold value are chosen. Thus a virtual node can represent a multitude of cache nodes or just a few cache nodes. The value of the internal communication cost for deciding which cache nodes to make up a virtual node can vary, e.g. depending on how dense the population of cache nodes are within a specific region and/or the size of a specific aggregation network. For example the value for the internal communication cost that has to be below a threshold in order for the cache nodes to be represented by the same virtual node, can be dynamically modified based on region and/or geographical proximity of the cache nodes and/or technical criteria, such as processing power and capacity, as well as based on content demand across a region. For example in a certain region the threshold value may be set so that all or an appropriate amount of cache nodes within the region may be represented by the virtual node.

According an embodiment of the invention further virtual nodes may be defined comprising a plurality of virtual nodes as described above. These further virtual nodes can be seen as representing these virtual nodes which in turn is representing a set of cache nodes. In this way the further virtual nodes have an even better view of the caching situation in the cache nodes that its virtual nodes represent. For example a further virtual node may determine to cache content in a cache node represented by a different virtual node than in a cache node included in the virtual node from which a content request originated from. The reason for this may e.g. be few originating content requests or free caching space.

In step 315, the virtual node will collect and keep statistics relating to content cached in the cache nodes represented by the virtual node. It may preferably also collect and keep statistics relating to content requested, but not cached in the cache nodes represented by the virtual node. As the virtual node is not a real node, it is basically keeping a sum total of all the content requested by the cache nodes which it is representing. Thus, it can see the regional demand of content rather than local demand. In step 320 it is determined whether content requested from one of the cache nodes in the virtual node is to be cached in the virtual node, i.e. in one of the cache nodes, or not. And if it is determined that the content is to be cached in the virtual node, the content may be caused to do so in step 325 by sending a proposal to the appropriate cache node. In which cache node in the virtual node the content is to be cached in can either be selected arbitrarily; or in the cache node that requested the particular content; or in the cache node having the highest number of requests for the particular content. An alternative is to have the cache nodes in a virtual node to share a percentage of the cache space of the virtual node. Thus, though logically the caching is happening at the virtual node, in reality it is cached by a real cache node.

Figure 4:
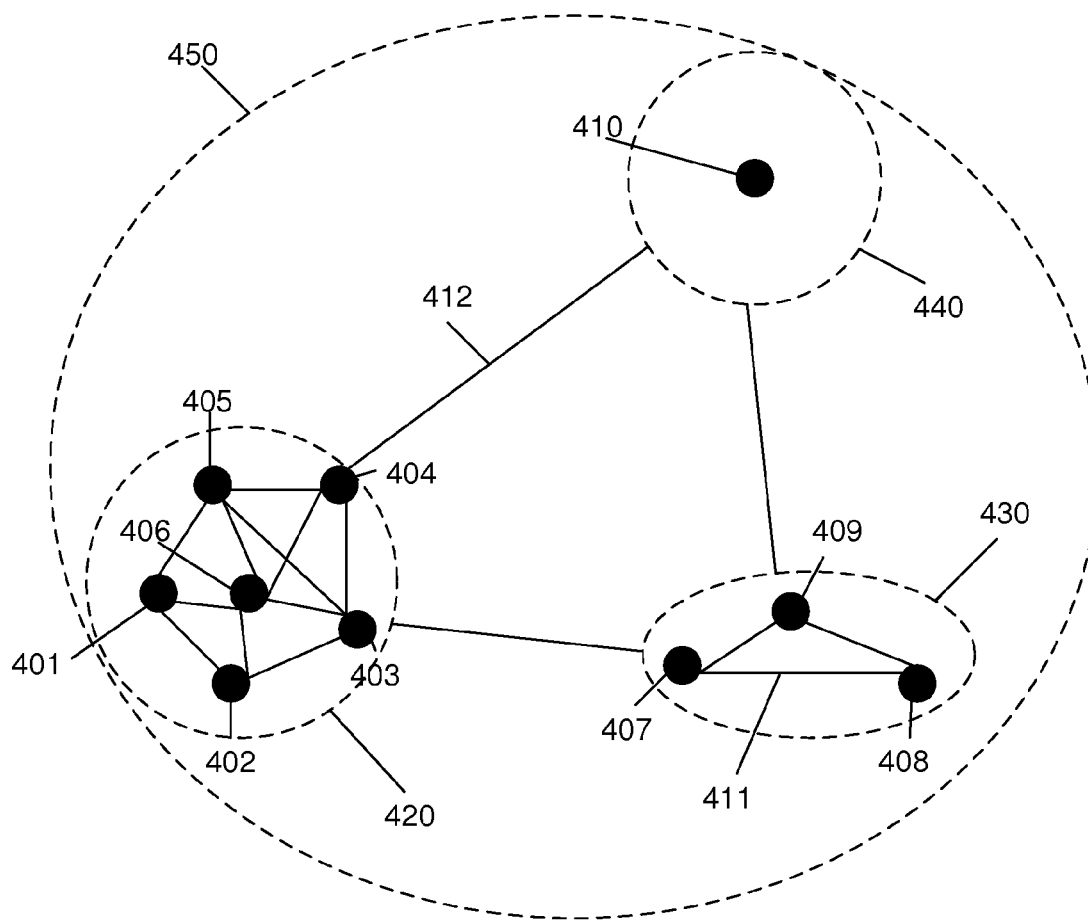
FIG. 4 illustrates a network where virtual nodes have been defined in accordance with the present invention.

FIG. 4 illustrates a network comprising a plurality of cache nodes 401-410 where virtual nodes 420, 430, 440 have been defined. The virtual node 420 logically represents a set of cache nodes 401-406, virtual node 430 represents cache nodes 407-409 and finally virtual node 440 represents cache node 410. Virtual node 450 represents the three virtual nodes 420, 430 and 440. All cache nodes 401-410 have a lowest path cost between each other and all cache nodes are connected by links 411, 412. Within the virtual node 420 the pair of cache nodes having the highest lowest path cost between them have a lowest path cost that is below the threshold value that is set as a criteria to be included in the virtual node 420. The intra links 411 within the virtual nodes are preferably low cost links, whereas the inter links 412 between the defined virtual nodes preferably are high cost links. However, the virtual nodes 420, 430, 440 may be more sensitively defined, whereby the cost for the links 412 would merely be slightly larger than the cost for the links 411. Virtual node 450 may be defined in a similar manner based on the path cost for the links 412 between the virtual nodes 420, 430 and 440. All virtual nodes having an inter link 412 cost being lower than a certain value (presumably much higher than the inter link 411 cost) may be included in a further virtual node 450, which can be seen as a virtual node arranged in a higher layer. This may continue with further virtual nodes being arranged in higher layers until a tree structure with virtual nodes are arranged in upper layers and with the cache nodes being arranged in the lowest layer. When determining the cost for the links 412 between a first and a second virtual node this may e.g. be done by choosing the cost between an arbitrary cache node in the first virtual node and an arbitrary cache node in the second virtual node. Another alternative is choosing the lowest cost between cache nodes in the first virtual node and cache nodes in the second virtual node. A further alternative is determining a mean distance between cache nodes in a first virtual node and cache nodes in a second virtual node. The same method may be applied for determining costs between virtual nodes in higher layers.

Figure 5:
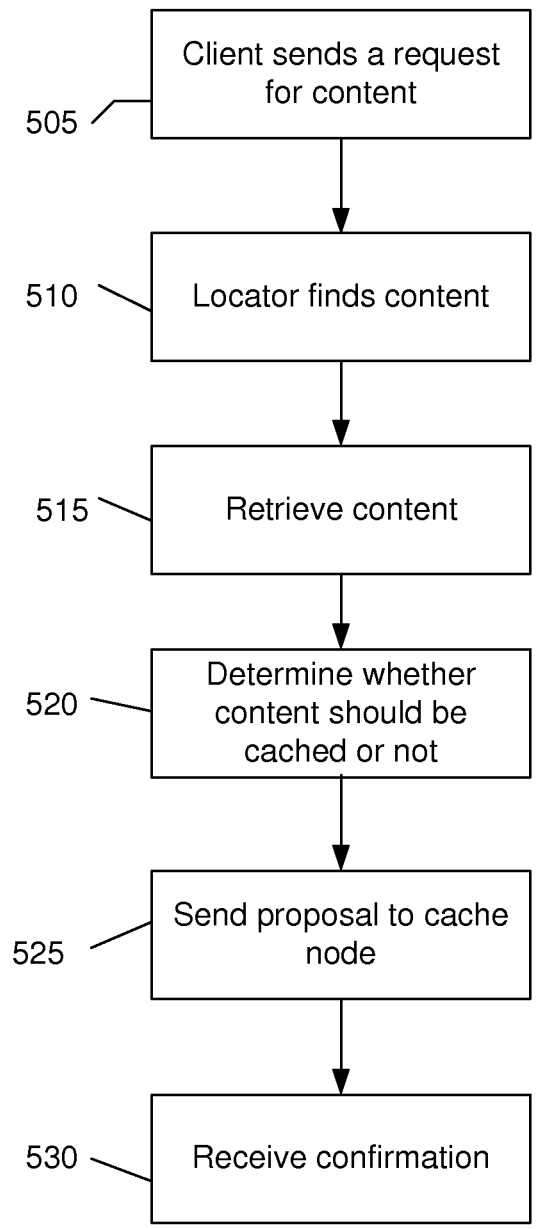
FIG. 5 is a flowchart illustrating the steps of distributing content in a CDN according to the teachings of the present invention.

FIG. 5 is a flowchart illustrating the steps, preferably performed by an allocator node, of distributing content in a CDN according to the teachings of the present invention. The scheme starts in step 505 when a client sends a request for a particular content. The request is forwarded to a locator node in step 510. The locator node preferably keeps information regarding all cache nodes in the network and at least some of their content. In a CDN there may be a plurality of locator nodes containing information of different categories of content. A first locator node may for e.g. contain information of in which cache nodes movies are cached, whereas a second locator node may contain information of in which cache nodes games are cached, etc. The locator node will check if the content can be found in any of the cache nodes, and if not redirect the request to the appropriate locator node. Once the request has reached the appropriate locator node, the requested content will be retrieved or fetched in step 515. In step 520 an allocator node, which may be the same entity as the locator node, may determine whether the requested content also should be cached in the cache node that sent the request or if it should be moved from its present cache node or if it only should be fetched without being further cached or if it should be cached in a different cache node. Content may also be moved from a cache node represented by the virtual node to a different cache node represented by the virtual node. The decision may then be sent to the appropriate cache nodes in step 525 and the cache nodes may return a confirmation to the allocator node in step 530. The decision and/or migration of content may be performed in accordance with the above mentioned deferred caching strategy.

FIG. 6 illustrates an example of what an entry for a virtual node in an allocator node may look like. The virtual node 430 in FIG. 4 is chosen as example. In its simplest version the virtual node merely includes entries for the cache nodes 407-409, the content that is cached in each of these nodes and the number of requests received for this content. Preferably information regarding the lowest cost for retrieving the content from other cache nodes is also included for each content. Preferably, the same information is kept in the node for content that is not cached in the node, but for which content requests have been received.

Figure 7:
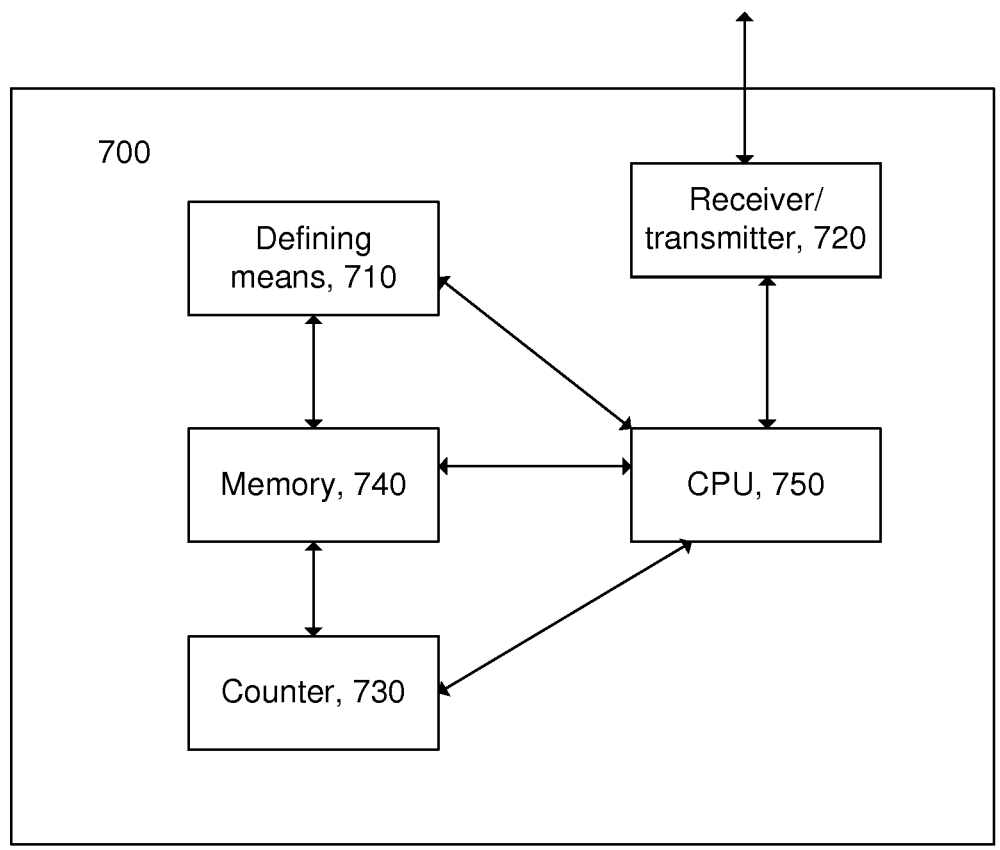
FIG. 7 schematically illustrates an allocator node according to an embodiment of the present invention.

FIG. 7 schematically illustrates a cache decision entity 700, which preferably is an allocator node, according to an embodiment of the present invention. The allocator node 700 includes means 710 for defining a virtual node logically representing a set of cache nodes, wherein the set of cache nodes is defined based on an internal communication cost between the cache nodes, in accordance with embodiments of the present invention. The allocator node 700 further includes a receiver 720 for receiving content requests from cache nodes and clients in the network and a counter 730 for counting all content requests from all cache nodes. All the gathered statistics and information regarding costs between cache nodes are preferably stored in memory 740. A processor or a central processing unit (CPU) 750 is included for, among other things, for determining, based on statistics gathered from all cache nodes represented by the virtual node, whether specific content is to be cached in the virtual node or not. The defining means 710 is closely linked with the processor 750 and may also be included in the processor. The allocator node 700 further includes a transmitter 720 for causing the requested content to be cached in a cache node by e.g. sending a proposal to the cache node.

The present invention provides a number of advantages over prior art systems for caching/distributing content in a network. By making a decision based on statistics regarding content requests, and preferably cost for retrieving the content, results in a high likelihood of making a good caching decision, which results in traffic savings. By collecting the statistics from each cache node in a set of cache nodes results in a more general view of the caching situation in a region and a better distribution of the content which further reduces network traffic, and core traffic in particular.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method in a content delivery network (CDN) comprising a plurality of cache nodes, the cache nodes being connected with communication links having a communication cost to other cache nodes in the CDN, the method comprising:

defining a virtual node logically representing a set of cache nodes among the plurality of cache nodes, wherein the set of cache nodes is defined based on an internal communication cost between pairs of cache nodes among the plurality of cache nodes;

collecting statistics regarding content requests in each of the cache nodes represented by the virtual node;

determining, based on the collected statistics, whether specific content is to be cached in the virtual node;

in response to determining to cache said specific content, causing the specific content to be cached in one or more of the cache nodes represented by the virtual node; and in response to a request for other specific content, determining whether the other specific content can be found in a subset of the plurality of cache nodes corresponding to a first locator node, and in response to determining that the other specific content cannot be found in the subset of the plurality of cache nodes corresponding to a first locator node, redirecting the request to a second locator node.

2. The method according to claim 1, wherein the method is performed by a cache decision entity.

3. The method according to claim 1, wherein the determination of whether specific content is to be cached in the virtual node is further based on a communication cost for retrieving the specific content.

4. The method according to claim 1, wherein the requested content is cached in a cache node that received the most requests for the requested content among the cache nodes represented by the virtual node.

5. The method according to claim 1, further comprising moving content from a cache node represented by the virtual node to a different cache node represented by the virtual node.

6. The method according to claim 1, further comprising caching content in a plurality of cache nodes represented by the virtual node.

7. The method according to claim 1, further comprising defining further virtual nodes logically representing a set of virtual nodes.

8. The method according to claim 7, further comprising:
determining, based on statistics gathered from all cache nodes represented by the virtual nodes represented by the further virtual node, whether specific content is to be cached in the further virtual node; and in response to determining to cache said specific content, causing the specific content to be cached in one or more of the cache nodes represented by the virtual nodes represented by the further virtual node.

9. A cache decision entity for storing content in a content delivery network having a plurality of content cache nodes to which content is distributed, the entity comprising:

a processor configured to define a virtual node logically representing a set of cache nodes among the plurality of cache nodes, wherein the set of cache nodes is defined based on an internal communication cost between pairs of cache nodes among the plurality of cache nodes;

a counter configured to collect statistics regarding content requests in each of the cache nodes represented by the virtual node, wherein the processor is further configured to determine, based on the collected statistics, whether specific content is to be cached in the virtual node; and a transmitter configured to cause specific content to be cached in one or more of the cache nodes represented by the virtual node, wherein the processor, in response to a request for other specific content, determines whether the other specific content can be found in a subset of the plurality of cache nodes corresponding to a first locator node, and in response to determining that the other specific content cannot be found in the subset of the plurality of cache nodes corresponding to a first locator node, redirects the request to a second locator node.

10. The cache decision entity according to claim 9, wherein the cache decision entity is an allocator node.

11. The cache decision entity according to claim 9, further comprising a memory configured to store information regarding the cache nodes represented by the virtual node, and for each cache node represented by the virtual node, store information regarding:
each content cached in the cache node;
a lowest cost for retrieving each content cached in the cache node from another node in the network; and
a number of requests received for each content.

12. The cache decision entity according to claim 11, wherein the memory is further configured to, for each cache node represented by the virtual node, store information regarding:
content not cached in the cache node, but for which requests have been received;
a lowest cost for retrieving said content not cached in the cache node from another node in the network; and
a number of requests received for said content not cached in the cache node.

13. A content delivery network (CDN), comprising:
a plurality of content cache nodes to which content is distributed;
a cache decision entity configured to store content in the CDN and comprising a processor configured to define a virtual node logically representing a set of cache nodes among the plurality of cache nodes, wherein the set of cache nodes is defined based on an internal communication cost between pairs of cache nodes among the plurality of cache nodes, a counter configured to collect statistics regarding content requests in each of the cache nodes represented by the virtual node, wherein the processor is further configured to determine, based on the collected statistics, whether specific content is to be cached in the virtual node, and a transmitter configured to cause specific content to be cached in one or more of the cache nodes represented by the virtual node, wherein the processor, in response to a request for other specific content, determines whether the other specific content can be found in a subset of the plurality of cache nodes corresponding to a first locator node, and in response to determining that the other specific content cannot be found in the subset of the plurality of cache nodes corresponding to a first locator node, redirects the request to a second locator node.

14. The CDN of claim 13, wherein the cache decision entity is an allocator node.

15. The CDN of claim 13, further comprising a memory configured to store information regarding the cache nodes represented by the virtual node, and for each cache node represented by the virtual node, store information regarding:
each content cached in the cache node;
a lowest cost for retrieving each content cached in the cache node from another node in the network; and
a number of requests received for each content.

16. The CDN of claim 15, wherein the memory is further configured to, for each cache node represented by the virtual node, store information regarding content not cached in the cache node, but for which requests have been received, a lowest cost for retrieving said content not cached in the cache node from another node in the network, and a number of requests received for said content not cached in the cache node.

\* \* \* \* \*